US007472056B2

(12) United States Patent
Sung et al.

(10) Patent No.: US 7,472,056 B2
(45) Date of Patent: Dec. 30, 2008

(54) TRANSCODER FOR SPEECH CODECS OF DIFFERENT CELP TYPE AND METHOD THEREFOR

(75) Inventors: Jongmo Sung, Daejeon (KR); Hyun Woo Kim, Seoul (KR); Do Young Kim, Daejeon (KR); Jin Kyu Choi, Seoul (KR); Sung Wan Yoon, Kyungki-do (KR); Hong Goo Kang, Seoul (KR); Ki Seung Lee, Seoul (KR); Dae Hee Youn, Seoul (KR)

(73) Assignee: Electronics and Telecommunications Research Institute, Daejeon-City (KR)

( * ) Notice: Subject to any disclaimer, the term of this patent is extended or adjusted under 35 U.S.C. 154(b) by 907 days.

(21) Appl. No.: 10/749,748

(22) Filed: Dec. 30, 2003

(65) Prior Publication Data

US 2005/0010403 A1 Jan. 13, 2005

(30) Foreign Application Priority Data

Jul. 11, 2003 (KR) ...................... 10-2003-0047455

(51) Int. Cl.
*G01L 19/00* (2006.01)
*G01L 19/02* (2006.01)
*G01L 19/12* (2006.01)
*G01L 19/14* (2006.01)

(52) U.S. Cl. .................... 704/200.1; 704/219; 704/220; 704/223; 704/E19.049

(58) Field of Classification Search .............. 704/200.1, 704/201, 219–221, 223
See application file for complete search history.

(56) References Cited

U.S. PATENT DOCUMENTS 5,694,519 A 12/1997 Chen et al.
5,845,244 A 12/1998 Proust
5,995,923 A * 11/1999 Mermelstein et al. ....... 704/219
6,144,935 A 11/2000 Chen et al.
6,260,009 B1 * 7/2001 Dejaco ....................... 704/221
6,584,441 B1 * 6/2003 Ojala et al. ................. 704/500
6,829,579 B2 * 12/2004 Jabri et al. .................. 704/221
7,184,953 B2 * 2/2007 Jabri et al. .................. 704/221
2004/0158463 A1 * 8/2004 Jabri et al. .................. 704/219
2004/0172402 A1 * 9/2004 Jabri et al. .................. 707/100

FOREIGN PATENT DOCUMENTS

EP 1202251 3/2001

OTHER PUBLICATIONS

Kim et al, "An efficient transcoding algorithm for G.723.1 and EVRC speech coders," IEEE VTC 54th,vol. 3, 2001, pp. 1561-1564.*

(Continued)

*Primary Examiner*—James S Wozniak
(74) *Attorney, Agent, or Firm*—Blakely, Sokoloff, Taylor & Zafman LLP

(57) ABSTRACT

A transcoder for use between speech codecs using different Code-Excited Linear Prediction (CELP) type and a method therefor are disclosed. The transcoder includes a decoding unit of an input CELP codec, a transcoding filter, a transcoding filter design unit, and an encoding unit of an output CELP codec. By substituting a post-filter and a perceptual weighting filter of a prior art with one transcoding filter, the calculation amount of the transcoder is reduced, and speech quality decoded at a receiving end is improved.

9 Claims, 5 Drawing Sheets

OTHER PUBLICATIONS

Juin-Hwey Chen, et al., "Adaptive Postfiltering for Quality Enhancement of Coded Speech", IEEE Transactions on Speech and Audio Processing, vol. 3, No. 1, Jan. 1995 (pp. 59-71).

Cheung-Fat Chan, "Efficient implementation of perceptual postfilter for CELP coding of speech", Electronics Letters, Nov. 21, 2002, vol. 38, No. 24 (pp. 1604-1605).

* cited by examiner

TRANSCODER FOR SPEECH CODECS OF DIFFERENT CELP TYPE AND METHOD THEREFOR

BACKGROUND OF THE INVENTION

This application claims the priority of Korean Patent Application No. 2003-47455, filed on Jul. 11, 2003, in the Korean Intellectual Property Office, the disclosure of which is incorporated herein in its entirety by reference.

1. Field of the Invention

The present invention relates to a code-excited linear prediction (CELP) speech coding technology, and more particularly, to a transcoder for speech codecs of different CELP type and a method therefor.

2. Description of the Related Art

Technologies for transferring digitized speech signals are widely used not only in wired telecommunication networks including ordinary telephone networks but also in wireless telecommunication networks and voice over internet protocol (VoIP) networks. When a speech signal is sampled in 8 kHz, and then coded in 8 bits per sample, a data bit rate of 64 kbps is needed. However, if speech analysis and an adequate coding method is adopted, it is possible to transfer speech with high quality at a much lower bit rate.

A vocoder is an apparatus which compresses speech by extracting parameters from a speech generation model. The vocoder includes an encoder analyzing speech to extract parameters from an input speech and a decoder synthesizing at a receiver from the parameters transmitted through a communication channel. Until recently, a time-domain vocoder based on linear prediction has been widely used. The time-domain vocoder calculates prediction filter coefficients to minimize errors of original samples by predicting present speech samples from previous speech samples, and performs modeling of error signals passing through a prediction filter by using an adaptive codebook and a fixed codebook.

The vocoder compresses speech signals with low bit rate by removing speech redundancy. In general, the speech signals have short-term redundancy due to a filtering operation of the lips and tongue and long-term redundancy due to the vibration of the vocal chords. A CELP vocoder models the short-term redundancy and the long-term redundancy using a short-term formant filter and a long-term pitch filter, respectively. Residual signals remained by removing the redundancies through the two filters may be encoded using White Gaussian Noise or multi-pulse modeling according to type of CELP used by the vocoder. The basis of this speech technology is to calculate coefficients of the two filters. A formant filter or a linear predictive coding (LPC) filter performs a short-term speech prediction procedure and a pitch filter performs a long-term speech prediction procedure. Finally, a residual signal is modeled to an optimum signal by using analysis-by-synthesis techniques. Thereafter, parameters transmitted to a channel through the analysis include formant, pitch and residual signal information.

There are various networks for speech transmission. Because the networks adopt unique codecs considering the network characteristics, a format conversion procedure between difference codecs is needed for inter-networking. The procedure is called a transcoding procedure and an apparatus performing the procedure is called a transcoder. Generally, a tandem method, which simply connects a decoder of a codec and an encoder of another codec, has been used for the transcoding procedure. However, the tandem method performs a speech encoding and decoding procedure twice, thereby resulting in low speech quality and long delay due to heavy computational amount. To overcome the drawbacks, a bitstream mapping method is used, in which a direct conversion is performed from an encoded bitstream without passing through a decoding procedure like in the tandem method.

FIG. 1 is a drawing for comparing transcoding procedures of a tandem method and a bitstream mapping method. With reference to FIG. 1, in a tandem method, an input speech signal is encoded in a bitstream A in an encoder 102, and then the bitstream A is transmitted to a first channel 104. The bitstream A received through the first channel is decoded in a decoder 106 of a transcoder 114 and then converted into a pulse coded modulation (PCM) signal. The decoded PCM signal is encoded in a bitstream B at an encoder 108 of the transcoder 114, and then transmitted to a decoder 112 through a second channel 110. An output speech signal is obtained through the decoder 112. The transcoder 114 used in the tandem method is composed of the decoder 106 and the encoder 108. On the other hand, in a bitstream mapping method presented in FIG. 1, an input speech signal is encoded in a bitstream A in an encoder 152, and then transmitted to a transcoder 156 through a first channel 154. The transcoder 156 directly converts the received bitstream A into a bitstream B by using a bitstream mapping method, and then transmits the bitstream B to a second channel 158. A decoder 160 decodes the bitstream B received through a second channel 158, and then generates an output speech signal.

FIG. 2 shows a transcoding procedure of FIG. 1, each codec performing. With reference to FIG. 2, a codec A 205 includes a perceptual weighting filter 210, an encoding unit 211, a decoding unit 212, and a post-filter 213. A codec B 215 includes a perceptual weighting filter 223, an encoding unit 222, a decoding unit 221, and a post-filter 220. A transcoder 114 converts a bitstream A in a format of the codec A 205 into a bitstream B in a format of the codec B 215 using the decoding unit 212, the post-filter 213, the perceptual weighting filter 223, and the encoding unit 222. An encoder with an ordinary CELP codec includes a perceptual weighting filter using the fact that perception rate in an acoustic sense is different according to a spectral pattern of a speech signal, and a decoder includes a post-filter for improving the tone quality by compensating spectral distortion generated by the perceptual weighting filter applied in the encoder.

With reference to FIG. 2, an input speech A passes through the perceptual weighting filter 210 considering characteristics of the human auditory organ, is converted into the bitstream A of the codec A format, and is transmitted to the transcoder 114. The transmitted bitstream A passes through the decoding unit 212 in the transcoder 114, and then passes through the post-filter 213 for compensating the effect of the perceptual weighting filter 210 applied in the encoder 102. The speech passing through the post-filter 213 is filtered in the perceptual weighting filter 223 before being encoded in the bitstream B of the codec B format. The speech passing through the perceptual weighting filter 223 is encoded in the bitstream B of the codec B format in the encoding unit 222, and then transmitted to the decoder 112. In the decoding unit 221, the received bitstream B is decoded, filtered in the post-filter 220 for compensating the effect of the perceptual weighting filter 223, and an output speech signal is obtained. The perceptual weighting filter and post-filter, two filters which are used in the described CELP codecs, are the following Equations.

$$\text{post-filter: } H_{pf}(z) = \frac{A(z/\gamma_n)}{A(z/\gamma_d)} \cdot (1 - \mu \cdot z^{-1}) \quad \text{[Equation 1]}$$

$$\text{perceptual weighting filter: } H_{pwf}(z) = \frac{A(z/\gamma_1)}{A(z/\gamma_2)} \quad \text{[Equation 2]}$$

where $$A(z) = 1 - \sum_{i=1}^{p} a_i \cdot z^{-1},$$

p is a linear predictive coding (LPC) order, μ is a tilt factor, $\gamma_n$ and $\gamma_d$ are weights of a post-filter, and $\gamma_1$ and $\gamma_2$ are weights of the perceptual weighting filter. In the transcoder 114, the post-filter 213 and the perceptual weighting filter 223 are connected in cascade, and for filtering a signal through the two filters, (2p+1)+2p times multiply-and-accumulate (MAC) operations and (2p+1)+2p memory allocations are needed for each speech sample. The transcoder 114 includes the post-filter 213 of the codec A 205 and the perceptual weighting filter 223 of the codec B 215. Regarded from a receiving end which receives an output speech B, the speech signal passes through two times perceptual weighting filtering and two times post-filtering. Thus, a calculation amount increases and speech spectral distortion occurs due to several times filtering.

SUMMARY OF THE INVENTION

The present invention provides a transcoder for speech codecs of different code-excited linear prediction (CELP) type and a method therefor, which provide high quality speech while reducing a computational amount during transcoding.

The present invention also provides a method for designing a transcoding filter for the transcoder.

The present invention also provides a computer readable medium having recorded thereon a computer readable program for executing the method of transcoding.

The present invention also provides a computer readable medium having recorded thereon a computer readable program for executing the method for designing a transcoding filter.

According to an aspect of the present invention, there is provided a transcoder for converting an input CELP codec stream of one format into an output CELP codec stream of another format, the transcoder including: a decoding unit of an input CELP codec, which converts a bitstream encoded in an input CELP codec format into a speech signal; a transcoding filter, which performs filtering of the speech signal decoded in the decoding unit of the input CELP codec with filter characteristics calculated by adapting an optimum weight to minimize spectral distortion on the basis of a reference filter; a transcoding filter design unit, which extracts the optimum weight to minimize spectral distortion of the transcoding filter from a weight set, and then supplies the optimum weight to the transcoding filter; and an encoding unit of an output CELP codec, which generates a bitstream in an output CELP codec format by encoding the speech signal filtered in the transcoding filter.

According to another aspect of the present invention, there is provided a transcoding method performed in the transcoder converting an input CELP codec stream of one format into an output CELP codec stream of another format, including: (A) generating a transcoding filter, which has perceptual weighting filter characteristics, to which a weight minimizing a spectral distortion is applied; (B) converting a bitstream encoded in an input CELP codec format into a speech signal; (C) filtering a speech signal generated in step (B) with the transcoding filter generated in step (A); and (D) generating a bitstream of an output CELP codec format by encoding the speech signal filtered in step (C).

According to another aspect of the present invention, there is provided a method of designing a transcoding filter of the transcoder which includes a decoding unit of an input CELP codec, which converts a bitstream encoded in an input CELP codec format into a speech signal, a transcoding filter which performs filtering of the converted speech signal with perceptual weighting filter characteristics, and an encoding unit of an output CELP codec, which generates a bitstream of an output CELP codec format by encoding the filtered speech signal, including: (A) generating a reference filter by using characteristics of a perceptual weighting filter and post-filter applied to the input CELP codec and of the perceptual weighting filter applied to the output CELP codec; (B) selecting an optimum weight which minimizes a spectral distortion of the transcoding filter from a pre-selected weight set on the basis of the reference filter; and (C) generating the transcoding filter by applying the weight selected in step (B).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1:
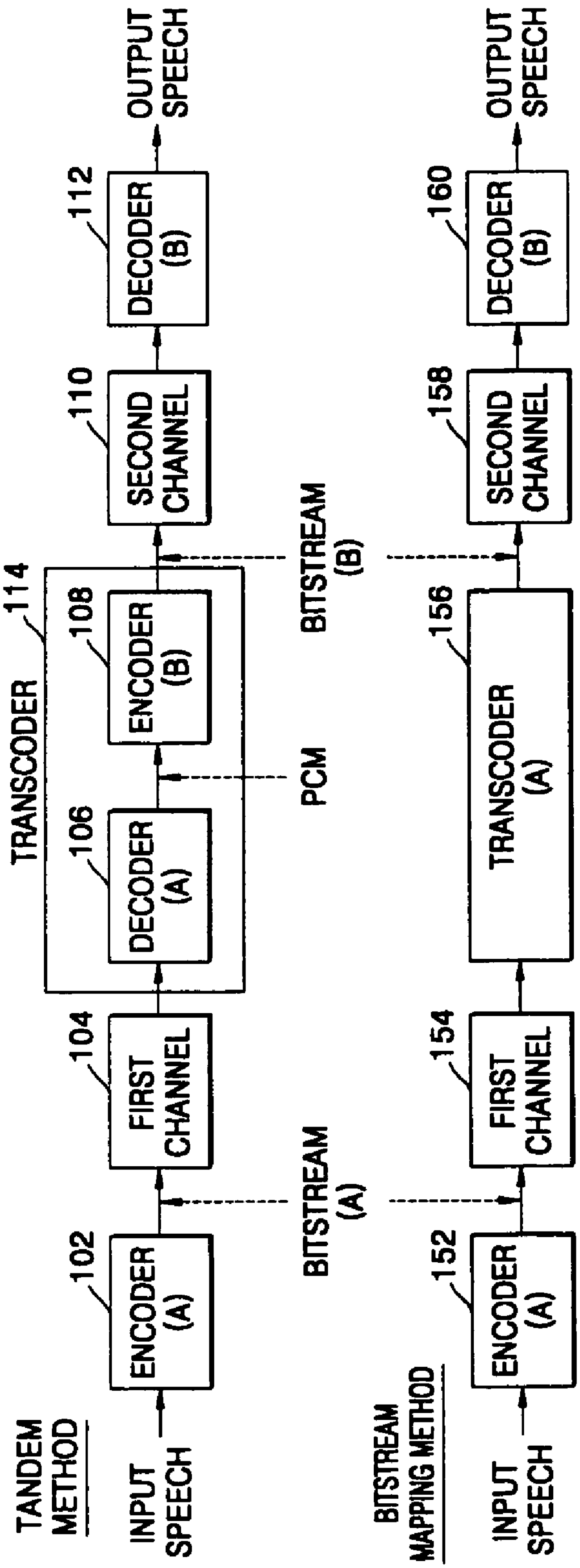
FIG. 1 (PRIOR ART)
FIG. 1 is a drawing for comparing transcoding procedures of a tandem method and a bitstream mapping method.
Figure 2:
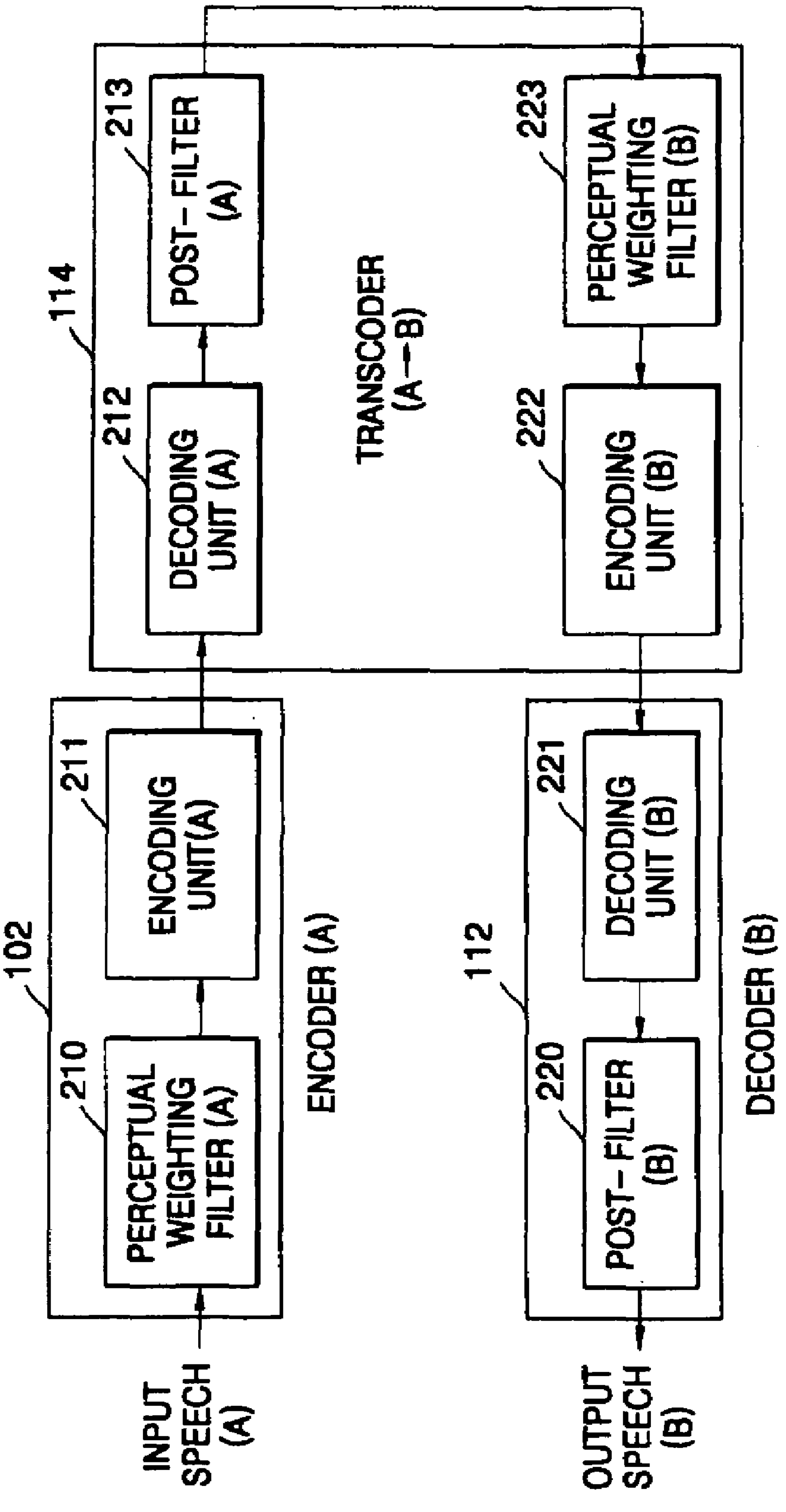
FIG. 2 (PRIOR ART)
FIG. 2 shows a transcoding procedure of FIG. 1, each codec performing.
Figure 3:
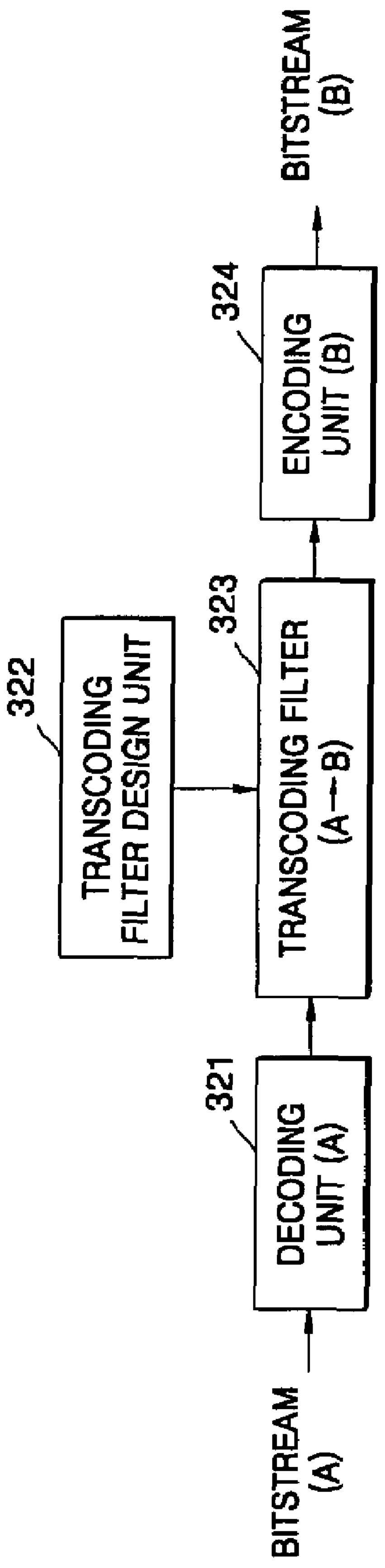
FIG. 3 is a block diagram of a transcoder with code-excited linear prediction (CELP) codecs of different types according to an embodiment of the present invention.

FIG. 3 is a block diagram of a transcoder with code-excited linear prediction (CELP) codecs of different types according to an embodiment of the present invention. The transcoder includes a decoding unit 321 of an input CELP codec, a transcoding filter 323, a transcoding filter design unit 322 and an encoding unit 324 of an output CELP codec.

With reference to FIG. 3, the decoding unit 321 of the input CELP codec converts a bitstream A encoded in an input CELP codec format into a speech signal.

The transcoding filter design unit 322 selects an optimum weight which minimizes spectral distortion of the transcoding filter 323 from a weight set ($\gamma_1$, $\gamma_2$). The detailed operation of the transcoding filter design unit 322 is described with reference to FIGS. 4 and 5.

The transcoding filter 323 applies the optimum weight selected in the transcoding filter design unit 322, and performs filtering of a speech signal decoded in the decoding unit 321. More precisely, the transcoding filter 323 is a perceptual weighting filter made up of a post-filter of the input CELP codec and a perceptual weighting filter of the output CELP codec. That is, the transcoding filter 323 uses Equation 2. At this time, a filter coefficient of the transcoding filter 323 is determined according to weights $\gamma_1$ and $\gamma_2$. The weights $\gamma_1$ and $\gamma_2$ are selected to minimize spectral distortion of the transcoding filter 323 by considering characteristics of a perceptual weighting filter and post-filter of the input CELP codec and the perceptual weighting filter of the output CELP codec by the transcoding filter design unit 322.

The encoding unit 324 of the output CELP codec generates a bitstream B of an output CELP codec format by encoding the speech signal filtered in the transcoding filter 323. Then, the bitstream B is restored to the original speech signal through decoding and post-filtering of an output CELP codec.

Figure 4:
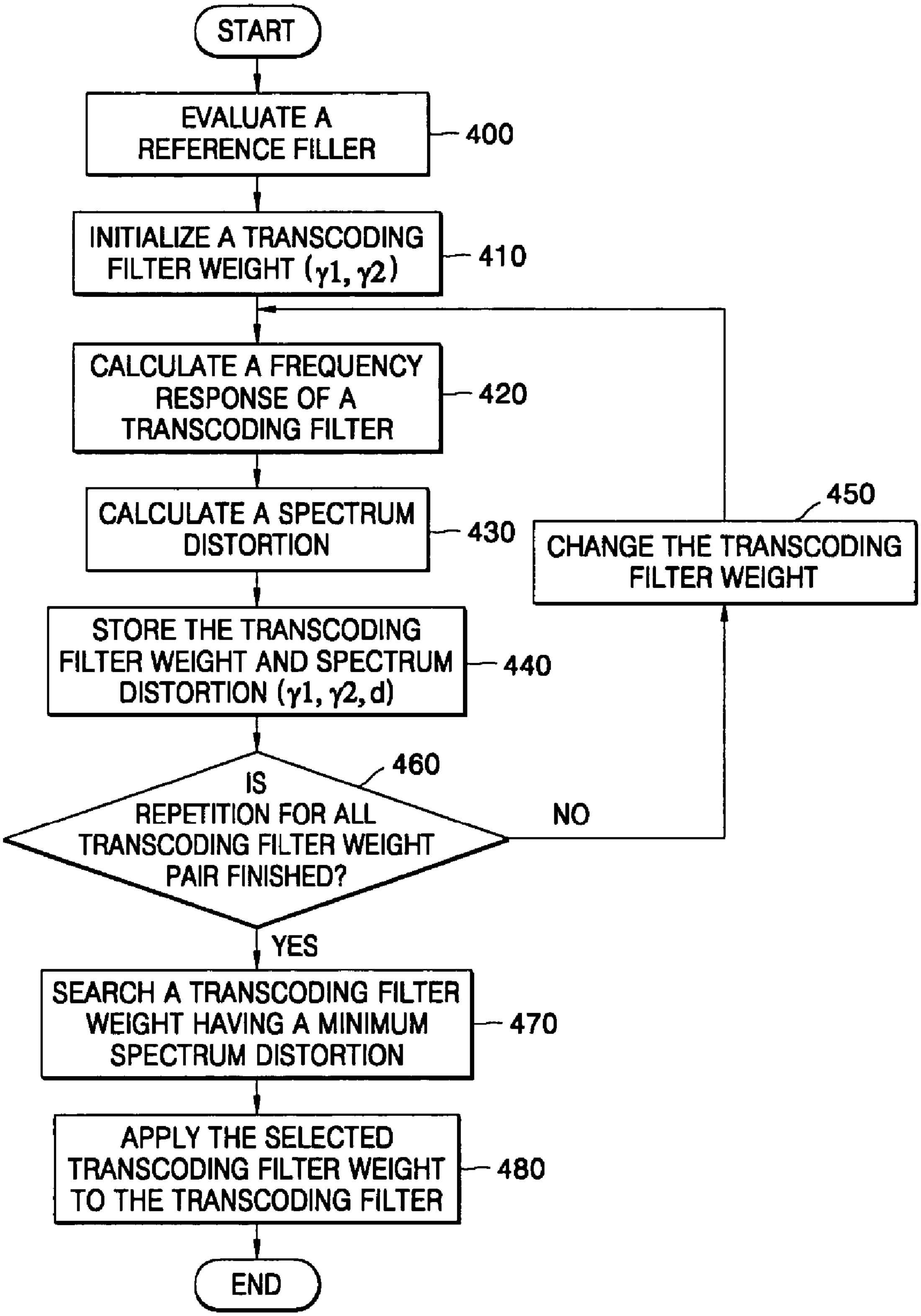
FIG. 4 shows a method of determining a weight of a transcoding filter performed in the transcoding filter design unit of FIG. 3 according to an embodiment of the present invention.

FIG. 4 shows a method of determining a weight of a transcoding filter performed in the transcoding filter design unit of FIG. 3 according to an embodiment of the present invention.

With reference to FIGS. 3 and 4, by using characteristics of the perceptual weighting filter and post-filter of the input CELP codec and the perceptual weighting filter of the output CELP codec, a reference filter for evaluating the transcoding filter is generated, and a frequency response of the generated reference filter is calculated in step 400.

Next, because the transcoding filter 323 uses the perceptual weighting filter in the form of Equation 2, for evaluating the transcoding filter, the weights $\gamma_1$ and $\gamma_2$ must be calculated. For this, first, the transcoding filter 323 is initialized in step 410 using a weight pair ($\gamma_1$, $\gamma_2$) selected from a pre-selected weight set.

The transcoding filter 323 is then evaluated using the weight pair selected in step 410, and a frequency response of the evaluated transcoding filter 323 is calculated in step 420.

After step 420, using the frequency response calculated in step 400 and the frequency response calculated in step 420, a spectral distortion d is calculated in step 430.

The spectral distortion d calculated in step 430 is stored in a separate storage space along with the weight pair in step 440.

After step 440, the weight pair of the transcoding filter 323 is changed to another weight pair from the weight set in step 450, and steps 410 through 440 are repeatedly performed.

After steps 410 through 440 are repeated for all weight pairs in step 460, with reference to the weight set and the spectral distortion d stored in step 440, a weight pair resulting in a minimum spectral distortion is set as an optimum weight pair in step 470. The optimum weight pair is then used in the transcoding filter 323 in step 480.

The search for a weight pair of designing the optimum transcoding filter 323 is performed offline through training, and an actual transcoding procedure is obtained by using the optimum weight pair in the transcoding filter 323.

Figure 5:
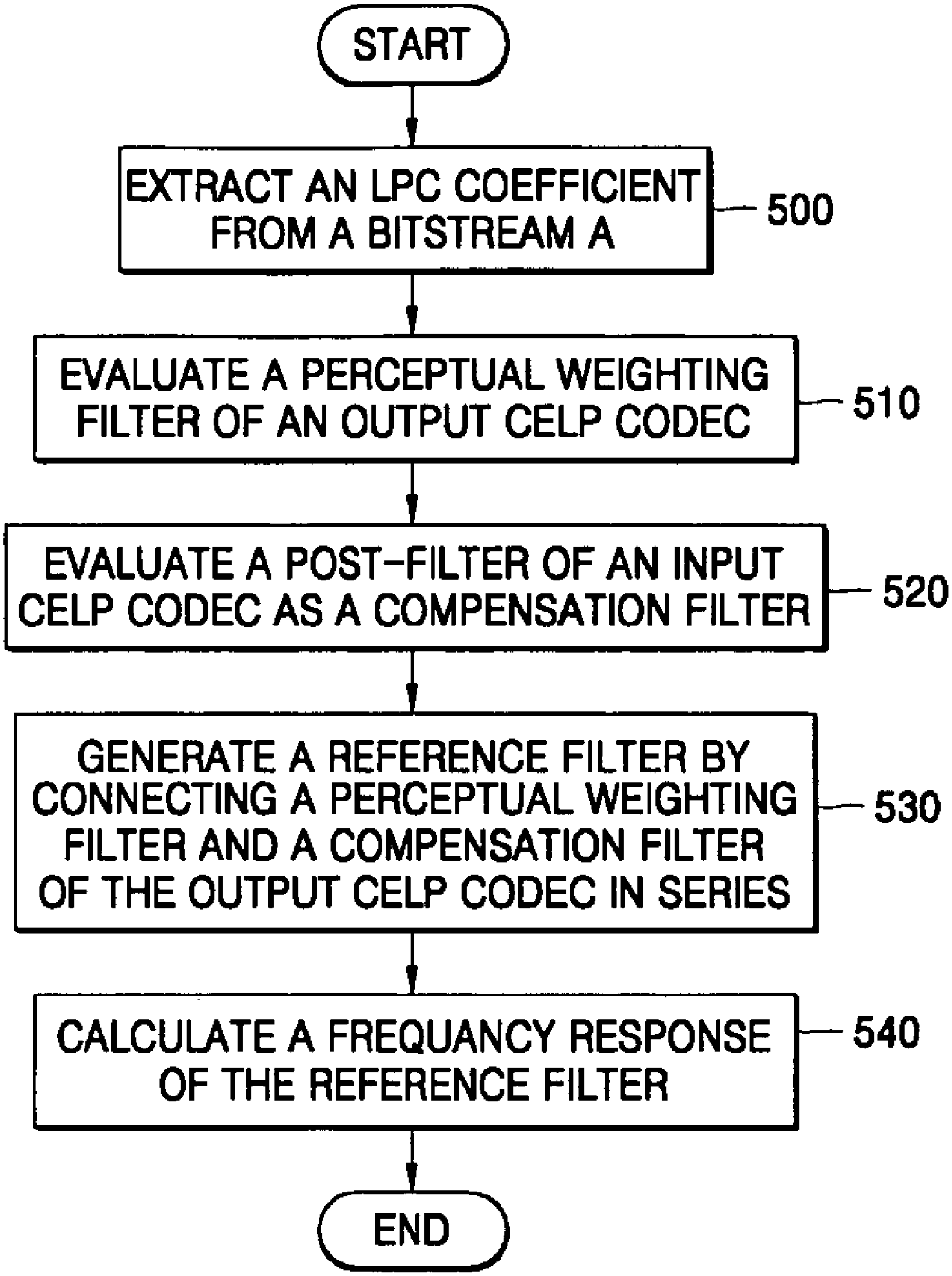
FIG. 5 is a detailed flowchart of a procedure of generating a reference filter performed in step 400 of FIG. 4.

FIG. 5 is a detailed flowchart of a procedure of generating a reference filter performed in step 400 of FIG. 4.

With reference to FIGS. 3 and 5, first, a LPC coefficient is extracted by decoding the bitstream A encoded in the input CELP codec format in step 500.

Using the LPC coefficient obtained in step 500, the perceptual weighting filter used in the output CELP codec is evaluated in step 510. For compensating the effect of the perceptual weighting filter used to generate the bitstream A in the input CELP codec, the post-filter used in a decoder of the input CELP codec is evaluated as a compensation filter of the perceptual weighting filter in step 520.

By connecting the compensation filter of the perceptual weighting filter obtained in step 520 and the perceptual weighting filter of the output CELP codec evaluated in step 510 in series, a reference filter for evaluating the transcoding filter 323 is generated in step 530.

A frequency response of the reference filter obtained in step 530 is calculated in step 540.

Although the post-filter used in the decoder of the input CELP codec is used as a compensation filter of the perceptual weighting filter of the input CELP codec in step 520, instead of the post-filter, an inverse-filter of the perceptual weighting filter used in the decoder of the input CELP codec may be evaluated as the compensation filter of the perceptual weighting filter.

By applying a transcoding filter having a perceptual weighting filter form designed by a method as described above, the number of filters may be reduced. Therefore, the calculation amount of a transcoder may be reduced, too. Also, by reducing the previous two filtering procedures by a post-filter and a perceptual weighting filter into one filtering procedure by one transcoding filter, the speech distortion by filtering is reduced, thereby improving the decoded speech quality of a bitstream received through a transcoder at a receiving end.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the Internet). The present invention may be embodied as a computer readable medium having a computer readable program code unit embodied therein for causing a number of computer systems connected via a network to effect distributed processing.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, according to a transcoder for speech codecs of different CELP type and a method therefor of the present invention, by substituting a post-filter and a perceptual weighting filter of a prior art with one transcoding filter, the calculation amount of the transcoder is reduced, and speech quality decoded at a receiving end is improved.

What is claimed is:

1. A transcoder for converting an input Code-Excited Linear Prediction (CELP) codec stream of one format into an output CELP codec stream of another format, comprising:

a decoding unit of an input CELP codec, which converts a bitstream encoded in an input CELP codec format into a speech signal;

a transcoding filter, which performs filtering of the speech signal decoded in the decoding unit of the input CELP codec with filter characteristics calculated by adapting an optimum weight to minimize spectral distortion based on a reference filter;

a transcoding filter design unit, which extracts the optimum weight to minimize spectral distortion of the transcoding filter from a weight set, and then supplies the optimum weight to the transcoding filter, the transcoding filter design unit to:

randomly select one weight pair from a weight set;

evaluate the transcoding filter by applying the selected weight pair to the transcoding filter having a perceptual weighting filter form;

calculate a frequency response of the evaluated transcoding filter;

calculate a spectral distortion of the transcoding filter by comparing the frequency response of the reference filter with the calculated frequency response;

calculate the spectral distortion corresponding to each weight pair by evaluating the transcoding filter by applying the selected weight pair to the transcoding filter having a perceptual weighting filter form, calculating the frequency response of the evaluated transcoding filter, and calculating the spectral distortion of the transcoding filter by comparing the frequency response of the reference filter with the calculated frequency response, for every weight pair from the weight set; and selecting a weight pair resulting in a minimum spectral distortion as the optimum weight; and an encoding unit of an output CELP codec, which generates a bitstream in an output CELP codec format by encoding the speech signal filtered in the transcoding filter.

2. The transcoder of claim 1, wherein the transcoding filter is a perceptual weighting filter which uses the equation $$H_{pwf}(z) = \frac{A(z/\gamma_1)}{A(z/\gamma_2)}$$

where $$A(z) = 1 - \sum_{i=1}^{p} a_i \cdot z^{-1},$$

p is a linear predictive coding (LPC) order, and $\gamma_1$ and $\gamma_2$ are weights of the perceptual weighting filter.

3. The transcoder of claim 1, wherein the transcoding filter design unit performs:

a procedure to generate the reference filter for evaluating the transcoding filter using characteristics of a perceptual weighting filter and post-filter of the input CELP codec and a perceptual weighting filter of the output CELP codec; and based on the reference filter, a procedure to evaluate a transcoding filter weight as an optimum weight when spectral distortion is minimum.

4. A transcoding method performed in a transcoder converting an input Code-Excited Linear Prediction (CELP) codec stream of one format into an output CELP codec stream of another format, comprising:

(A) generating a transcoding filter, which has perceptual weighting filter characteristics, to which a weight minimizing a spectral distortion is applied, wherein step (A) comprises:

(A1) generating a reference filter for evaluating the transcoding filter by using characteristics of a perceptual weighting filter and post-filter applied to the input CELP codec and of a perceptual weighting filter applied to the output CELP codec;

(A2) randomly selecting one weight pair from a weight set;

(A3) evaluating the transcoding filter by applying the selected weight pair to the transcoding filter having a perceptual weighting filter form;

(A4) calculating a frequency response of the transcoding filter evaluated in step (B2);

(A5) calculating a spectral distortion of the transcoding filter by comparing the frequency response of the reference filter with the frequency response calculated in step (A3);

(A6) calculating the spectral distortion corresponding to each weight pair by performing steps (A3) through (A5) for every weight pair from the weight set;

(A7) selecting a weight pair resulting in a minimum spectral distortion as the weight minimizing a spectral distortion is applied; and (A8) based on the reference filter, generating the transcoding filter, to which the weight minimizing the spectral distortion is applied, having the perceptual weighting filter characteristics;

(B) converting a bitstream encoded in an input CELP codec format into a speech signal;

(C) filtering a speech signal generated in step (B) with the transcoding filter generated in step (A); and (D) generating a bitstream of an output CELP codec format by encoding the speech signal filtered in step (C).

5. The method of claim 4, wherein step (A1) comprises:

(A1_1a) extracting an LPC coefficient by decoding a bitstream encoded in the input CELP codec format;

(A1_2a) evaluating the perceptual weighting filter to be used in the output CELP codec by using the LPC coefficient obtained in step (A1_1a);

(A1_3a) evaluating, as a compensation filter, a post-filter for compensating the effect of the perceptual weighting filter used for generation of the bitstream encoded in the input CELP codec format; and (A1_4a) evaluating the reference filter by connecting the compensation filter evaluated in step (A1_3a) and the perceptual weighting filter evaluated in step (A1_2a) in series.

6. The method of claim 4, wherein step (A1) comprises:

(A1_1b) extracting the LPC coefficient by decoding the bitstream encoded in the input CELP codec format;

(A1_2b) evaluating the perceptual weighting filter to be used in the output CELP codec by using the LPC coefficient obtained in step (A1_1b);

(A1_3b) evaluating, as the compensation filter, an inverse-filter for compensating the effect of the perceptual weighting filter used for generation of the bitstream encoded in the input CELP codec format; and (A1_4b) evaluating the reference filter by connecting the compensation filter evaluated in step (A1_3b) and the perceptual weighting filter evaluated in step (A1_2b) in series.

7. A method of designing a transcoding filter of the transcoder which includes a decoding unit of an input Code-Excited Linear Prediction (CELP) codec, which converts a bitstream encoded in an input CELP codec format into a speech signal, a transcoding filter which performs filtering of the converted speech signal with perceptual weighting filter characteristics, and an encoding unit of an output CELP codec, which generates a bitstream of an output CELP codec format by encoding the filtered speech signal, comprising:

(A) generating a reference filter by using characteristics of a perceptual weighting filter and post-filter applied to the input CELP codec and of the perceptual weighting filter applied to the output CELP codec;

(B) selecting an optimum weight which minimizes a spectral distortion of the transcoding filter from a pre-selected weight set on the basis of the reference filter, wherein step (B) comprises:

(B1) randomly selecting one weight pair from a weight set;

(B2) evaluating the transcoding filter by applying the selected weight pair to the transcoding filter having a perceptual weighting filter form;

(B3) calculating a frequency response of the transcoding filter evaluated in step (B2);

(B4) calculating a spectral distortion of the transcoding filter by comparing the frequency response of the reference filter with the frequency response calculated in step (B2);

(B5) calculating the spectral distortion corresponding to each weight pair by performing steps (B2) through (B4) for every weight pair from the weight set; and (B6) selecting a weight pair resulting in a minimum spectral distortion as the optimum weight; and (C) generating the transcoding filter by applying the weight selected in step (B); and (D) filtering the converted speech signal using the transcoding filter.

8. The method of claim 7, wherein step (A) comprises:

(A1_1a) extracting an LPC coefficient by decoding the bitstream encoded in the input CELP codec format;

(A1_2a) evaluating the perceptual weighting filter to be used in the output CELP codec by using the LPC coefficient obtained in step (A1_1a);

(A1_3a) evaluating, as a compensation filter, the post-filter for compensating the effect of the perceptual weighting filter used for generation of the bitstream encoded in the input CELP codec format; and (A1_4a) evaluating the reference filter by connecting the compensation filter evaluated in step (A1_3a) and the perceptual weighting filter evaluated in step (A1_2a) in series.

9. The method of claim 7, wherein step (A) comprises:

(A1_1b) extracting the LPC coefficient by decoding the bitstream encoded in the input CELP codec format;

(A1_2b) evaluating the perceptual weighting filter to be used in the output CELP codec by using the LPC coefficient obtained in step (A1_1b);

(A1_3b) evaluating, as the compensation filter, an inverse-filter for compensating the effect of the perceptual weighting filter used for generation of the bitstream encoded in the input CELP codec format; and (A1_4b) evaluating the reference filter by connecting the compensation filter evaluated in step (A1_3b) and the perceptual weighting filter evaluated in step (A1_2b) in series.

* * * * *